United States Patent
Pajarre

[19]

[11] Patent Number: 6,088,033
[45] Date of Patent: Jul. 11, 2000

[54] METHOD AND APPARATUS FOR PROCESSING PICTURE ELEMENTS

[75] Inventor: Eero Pajarre, Tampere, Finland

[73] Assignee: VLSI Solution Oy, Tampere, Finland

[21] Appl. No.: 09/112,053

[22] Filed: Jul. 9, 1998

[30] Foreign Application Priority Data

Jul. 9, 1997 [FI] Finland .................................. 972923

[51] Int. Cl.⁷ .................................................. G06F 15/00
[52] U.S. Cl. .......................................................... 345/419
[58] Field of Search .................................. 345/419, 440, 345/421, 422, 118, 121

[56] References Cited

U.S. PATENT DOCUMENTS

| | | | |
|---|---|---|---|
| 5,307,449 | 4/1994 | Kelly et al. .............................. | 345/419 |
| 5,761,401 | 6/1998 | Kobayashi et al. ...................... | 345/430 |

FOREIGN PATENT DOCUMENTS

| | | |
|---|---|---|
| 489594A3 | 6/1992 | European Pat. Off. . |
| 733977A1 | 9/1996 | European Pat. Off. . |
| 2228652 | 6/1990 | United Kingdom . |
| 95/27267 | 10/1995 | WIPO . |

Primary Examiner—Phu K. Nguyen
Attorney, Agent, or Firm—Pillsbury Madison & Sutro LLP

[57] ABSTRACT

A pixel processing apparatus receives pixels from an external source (100) and stores them in a storage area (110). A data path (120) performs mathematical operations and tests whether or not a pixel is to be suppressed. For an effective memory access, a control logic (130) provides addresses to the storage area (110). The control logic (130) receives status data from the data path (120), indicating whether or not a pixel is to be suppressed and modifies the status register (140) accordingly. The control logic (130) prevents the data path (120) from performing further operations on a pixel if the status register (140) indicates that the pixel is to be suppressed. Preferably, the control logic suppresses address generation for the location of the pixel in question if said status register (140) indicates that the pixel is to be suppressed.

8 Claims, 2 Drawing Sheets

METHOD AND APPARATUS FOR PROCESSING PICTURE ELEMENTS

BACKGROUND OF THE INVENTION

Rendering three-dimensional (3-D) graphics is an increasingly important application area for data processing units. This process is often aided with hardware implemented as integrated circuits.

Typically the 3-D graphics rendering process consists of several tasks. The rendering process begins from a collection of high level application data which describes the scene to be rendered as a collection of objects. These objects are then translated to a suitable co-ordinate space for the rendering system and their different attribute values are computed. The translated object information is then converted in a process called rasterization to a set of data values for each pixel (=picture element) covered by the object. As is well known, a rasterizer converts vector-based objects to pixels adapted for the rendering device, such as a display adapter. For simplicity, the invention will be described in connection with display devices but the invention is equally suited to hardcopy rendering devices (printers or film generators), although the requirement for speed is usually most intensive in real-time display systems.

The data values (or parameters) for each pixel can be broadly classified into two types. The first type of parameters indicate where and how a pixel should be rendered. These parameters comprise the co-ordinate (X, Y) and color (C) of the pixel. (The term "color" can also refer to shades of a single color, such as shades of gray). The second type of parameters contains information regarding to whether the pixel is to be drawn or suppressed. These parameters typically comprise a Z value which represents the pixel depth on the screen. The Z value is used in assembling the image correctly so that the images in front of the scene obstruct the objects behind them. (Within the context of this application, the terms "in front of" and "behind" should be interpreted as seen from the viewpoint of an imaginary viewer.) Also, one or more surface map or texture ("T") co-ordinate sets can be associated with each pixel. Other reasons for suppressing a pixel generated by the rasterizer can be e.g. implementing a transparency effect. This can be achieved by selecting pixels to be suppressed based on a raster pattern, or by implementing surfaces with holes in them by special texture attributes. The overall effect is that a significant portion of the pixels generated by the rasterizer will not be written to the screen memory.

The last step of the rendering process assembles and combines this data stream with the existing graphics state in order to create the final pixel values. The assembly process for a single pixel depends usually on several parameters, and also on the values of the pixels which have been previously rendered on the screen. The most typical dependency between pixels is the Z buffer ordering. If two pixels have the same co-ordinate values (X,Y) their Z values are compared, and the latter pixel is only drawn if its Z values designates it to be in front of the previous pixel. Thus the Z buffer comparison can cause a pixel to be suppressed (not drawn).

It is possible to handle the drawing operation by placing the units specified for each task in series, i.e. one after another. The problem with this architecture is that it is not very flexible. There are also limitations for the maximum complexity for the operations supported because each stage in the pipeline adds to the overall amount of the hardware.

Another problem with the previous architecture is that it requires separate dedicated memories for each portion, i.e. the Z, T and C buffers. Otherwise the multiplexing between the different tasks would cause an inefficient pattern of memory usage.

As all the operations are in the same pipeline it is difficult to delete pixels from the pipeline, for example after the Z comparison. In prior art systems, the pixels to be suppressed are tagged (marked) with a flag bit. During the Z and C write stages the pixel data tagged with such flag bits are not written to external memory.

It is possible to access the memory more effectively by performing each operation to a group of pixels in sequence and then advancing the processing to next operation stage. Because at any point of time, only one stage of the processing is being carried out, it is possible to use the same data path for implementing different stages. In this kind of architecture, the processing for a vector of pixels proceeds as follows: 1) the Z-values are read from the memory and compared; 2) each pixel is tagged with the comparison result; 3) the pixel's Z values are written to the Z buffer, but for the pixels which failed the Z comparison the actual write is suppressed. The same steps are repeated for the texture (T) and color (C) information. Again, the actual write operation is suppressed for the pixels which failed the Z comparison. It is notable that in existing implementations of this architecture, the pixels which failed the Z comparison are not removed from further processing which means that essentially all the processing concerning the texture, transparency etc. will be carried out for each pixel, regardless of whether or not the pixel will be drawn.

BRIEF SUMMARY OF THE INVENTION

Accordingly, it is an object of the present invention to produce a method and an apparatus for rendering three-dimensional graphics which result in a more efficient use of memory and/or faster execution than in prior art systems. The object is achieved with a method and an apparatus which are characterized by what is disclosed in the attached independent claims. Advantageous embodiments of the invention are disclosed in the dependent claims.

The general idea of the invention is to avoid performing calculations for pixels which will not be drawn later. This idea can be implemented with a new kind of interleaving between the various processing stages. According to the invention, the decision of whether or not to draw a pixel is moved towards the beginning of the processing. However, the implementation of these general ideas is not straightforward, as the addressing of the pixel memory will be more complicated, but it can be demonstrated that the savings in pixel processing outweigh the additional overhead of address generation. If the invention is implemented optimally, no more clock cycles are wasted on pixels which are to be suppressed, i.e. they have been determined to be behind other pixels, transparent, or for other reasons. This optimal implementation is based on a status indicator for each pixel to be processed. This status indicator is used for preventing address generation to memory locations storing pixels which are to be suppressed.

BRIEF DESCRIPTION OF THE SEVERAL VIEWS OF THE DRAWING

The method and the apparatus according to the invention will be described in more detail by means of a preferred embodiment with reference to the appended drawing wherein.

DETAILED DESCRIPTION OF THE INVENTION

Figure 1:
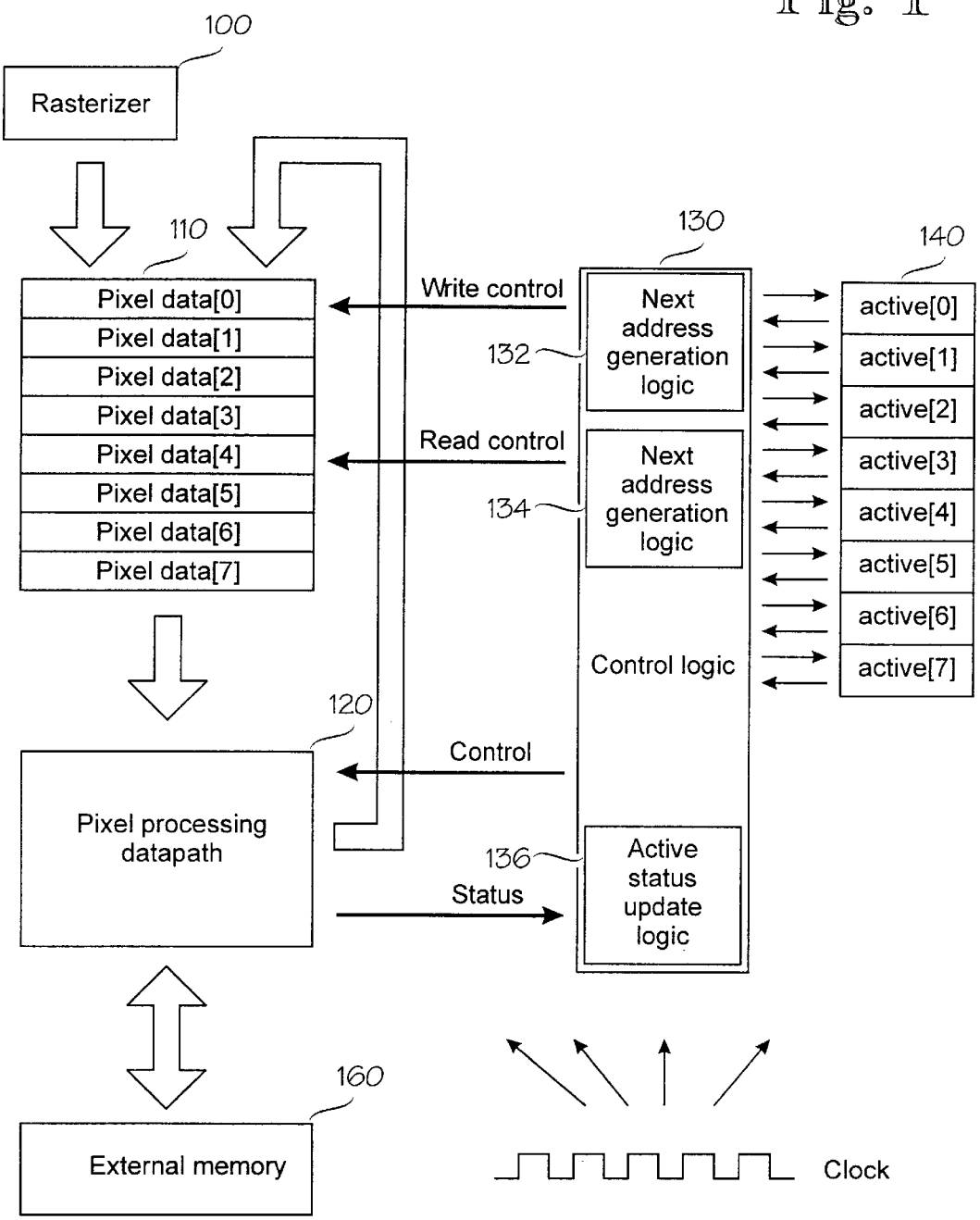
FIG. 1 shows an exemplary apparatus for implementing the invention.

Referring to FIG. 1, an exemplary apparatus for implementing the invention consists of four major sections: a storage area 110, a data path unit 120, a control logic unit 130 and an active state register vector 140. The selected size (8) of the pixel data storage 110 and the active state register 140 is only for purposes of illustration.

The apparatus of FIG. 1 is connected to a pixel data source 100. This source is typically a rasterizer which is not shown separately. As is well known, a rasterizer converts vector-based objects to pixels adapted for the rendering device, such as a display adapter.

Figure 2:
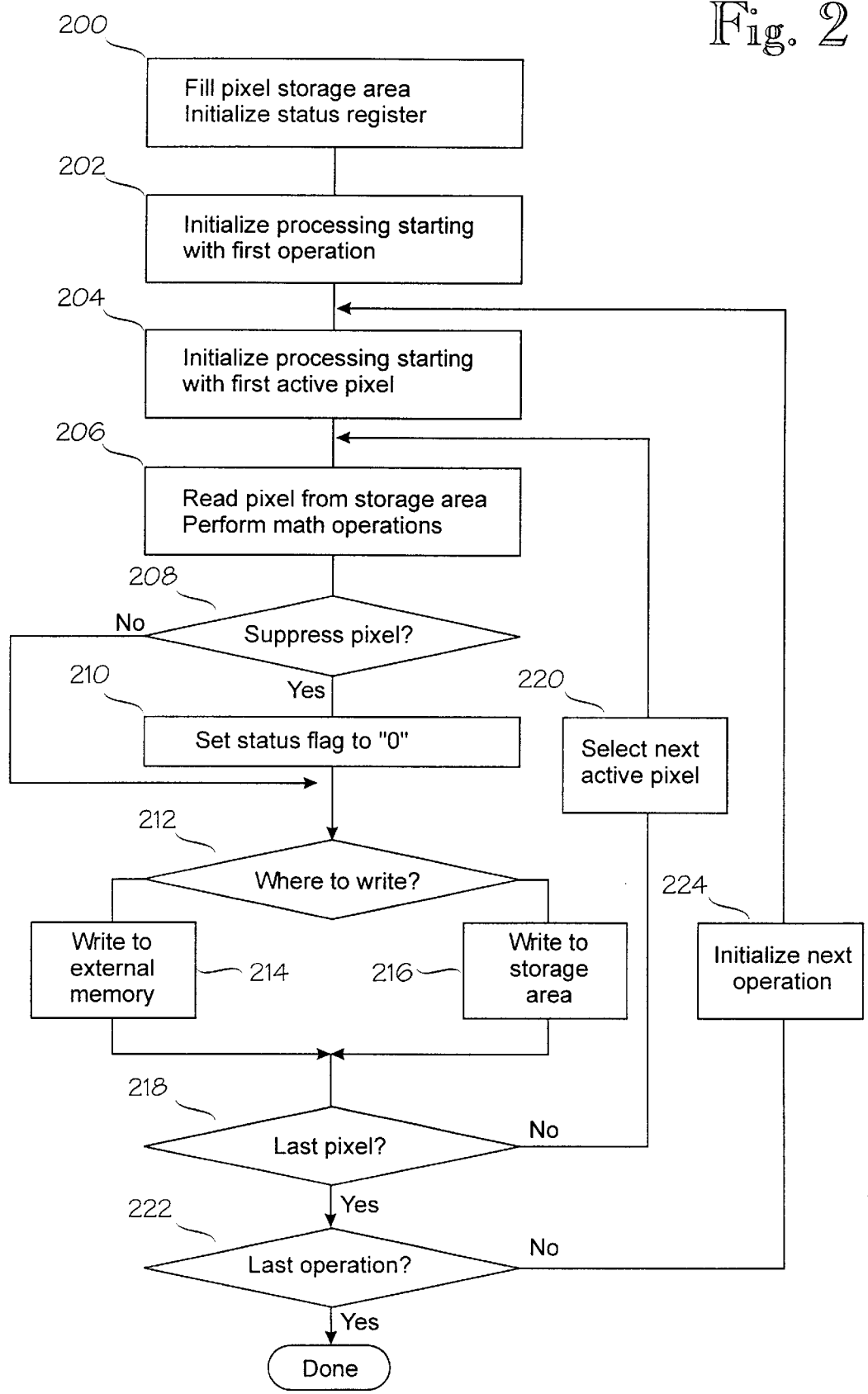
FIG. 2 shows a flow chart for illustrating an exemplary method according to the invention.

Referring now to FIG. 2, the general idea of the invention will now be described. At stage 200, the apparatus of FIG. 1 receives a number of pixels from the rasterizer. The pixels will be stored in the pixel storage area 110. For each pixel received, the corresponding status bit in active state register 140 is initialized to an active state, e.g. "1". Ideally, the active state register is initialized for all received pixels as follows. While the pixels are being received their number is counted. This count is needed also for determining the location for the next pixel. After receiving a set of pixels, the corresponding bits of the active state register are initialized to "1".

At stages 202 and 204 processing is initialized beginning with the first mathematical operation and the first pixel in the storage area. This initialization involves mainly setting certain pointers to the correct addresses and operations. At stage 206, a pixel will be read from the storage area 110 into the data path unit 120. The read address will be generated by the control logic unit 130. The data path unit 120 performs certain mathematical operations on the pixel. At stage 208 the data path unit 120 determines whether or not the pixel being processed is to be suppressed. This determination is typically based on the Z buffer comparison or a texture map analysis described above. At stage 210, if the pixel is to be suppressed the corresponding status indicator will be set to a passive state, i.e. "0". At stage 212, depending on the operation which is currently being performed, the processing either continues at stage 214 where the pixel data is written to external memory, or at stage 216 where the pixel data is written to back to the internal storage area 110. At stage 218, if more pixels are to be processed, the process continues to stage 220 where the next active pixel is selected, "active" meaning that the corresponding status indicator is in the active state. Optimally this involves skipping the address generation to locations of the storage area 110 storing pixels to be suppressed.

If the pixel tested at stage 218 was the last pixel to be processed the process advances to stage 222 where it is tested whether or not more mathematical operations are to be performed. If yes, the process advances to stage 224 where the next operation is initialized.

It should be noted that the purpose of the flowchart of FIG. 2 is to illustrate rather than limit the invention. For example, it is possible to receive, process and output several pixels at a time. The most important aspect of the flowchart of FIG. 2 is that optimally at stages 216 and/or 220, the data path unit 120 is prevented from accessing (reading and/or writing) a pixel inside the storage area 110 if it has been determined that the pixel in question is to be suppressed, i.e. it is behind other pixels, it is transparent, or for other reasons.

The functions of the blocks of FIG. 1 will now be described in more detail. The storage area 110 stores the data values which describe the set of pixels currently being processed. The storage area 110 is shown as a multiport RAM memory. In practice, the storage area 110 can be implemented by means of a multiplexer and conventional dual port RAM memory (simultaneous reading and writing). Some portions of the storage area 110 are filled with the incoming data stream from the rasterizer 100, and some portions of the storage area are written with values coming from the data path unit 120 during the processing of the pixel. It may be advantageous to use a larger data storage area for pixels and utilize it as a buffer by filling a portion (one half) of the storage area from the rasterizer at the same time as the processing is being carried out at the other portion of the storage area.

The data path unit 120 receives a stream of data values from the storage area 110 and it processes the data stream by performing arithmetic and/or logical operations on the pixel data. It also accesses external memory (read or write operations) based on the data. Typical operations carried out by the data path unit 120 comprise:

Using parts of the input data stream (the X,Y co-ordinates) as addresses for Z buffer locations and performing a Z buffer (external memory) read based on those addresses. This can be combined with comparison with the Z value of the pixel. The comparison results are transmitted to the control logic unit 130.

Writing Z buffer values from the storage area 110 to the external memory.

Using parts of the input data stream as co-ordinates for a texture map, and performing a texture (external memory) fetch based on the resulting addresses. The resulting texture values are stored back to the storage area 110.

Performing a blend operation between different color values stored in the storage area 110. The resulting color values are stored back to the storage area 110.

Writing color values from the storage area 110 to the external memory 160.

A control logic unit 130 controls the sequence of operations. It generates the addresses used in reading and writing data to the storage area. It also generates the control signals for the data path unit 120. These control signals define the operation which is to be performed. The control logic unit 130 also accepts the status signals from the data path and controls the active state register 140 based on these signals.

The active state register 140 is preferably organized as a vector (a one-dimensional array) comprising at least one bit for each pixel within the storage area 110. When processing is started on a set of pixels, for each pixel the corresponding bit is set to an active logical state, e.g. "1". When a pixel is to be suppressed, the corresponding active bit is toggled, i.e. set to "0". For flexibility, there can be several criteria for suppressing a pixel, such as a Z buffer comparison, or a raster transparency check.

In the example shown in FIG. 1, the active state register 140 is directly connected to the control logic unit 130. The advantage of the direct connection is that the values in the active state register 140 can directly affect e.g. the address generation units for the storage area 110. This makes it possible to not only skip unnecessary mathematical operations but to also prevent the data path unit from receiving a pixel if it has been determined that the pixel in question is to be suppressed. This results in an improved memory access pattern and increases the performance of the system.

The operation of the embodiment shown in FIG. 1 will now be described in connection with a detailed example. To keep the description compact, it will assumed that in this example, the active state register vector comprises 8 bits, the rightmost bit being the least significant one. However, the selected number of bits and the notations used are mere examples and they are not intended to restrict the invention.

1. The operation begins with six pixels in the processing unit. These pixels are stored in the storage area 110. The status of the active state register vector 140 is "00111111".

2. A Z read is performed. The control logic unit 130 generates read addresses for each location of the storage area 110 for which the corresponding bit in the active state register vector 140 is "1". In this example, the following read addresses will be generated in sequence: 0, 1, 2, 3, 4 and 5. The pixel screen address values read from these locations are used to perform Z buffer reads in the data path unit 120. This phase takes 6 clock cycles time plus the amount of clock cycles needed to start and stop the pipeline operation. Assume that during the Z compare the pixels 1, 3 and 4 are found to be behind other object(s) in the Z buffer. In response to this, the control logic unit 130 turns off the corresponding bits in the active state register 140, the status of which will now be "00100101".

3. A Z write is performed. The control logic unit 130 generates the following read addresses for the pixel data memory in sequence: 0, 2 and 5. The pixel screen address values read from these locations are used to perform Z buffer writes in the data path unit 120. This phase takes 3 clock cycles time plus the amount of clock cycles needed to start and stop the pipeline operation.

4. A texture (T) mapping is performed. The control logic unit 130 generates the following read addresses for the storage area 110 in sequence: 0, 2 and 5. The texture co-ordinate values read from these locations are used to perform texture reads in the data path unit 120. This phase takes 3 clock cycles time plus the amount of clock cycles needed to start and stop the pipeline operation.

5. A color (C) write is performed. The control logic unit 130 generates the following read addresses for the pixel data memory in sequence: 0, 2 and 5. The pixel screen address values read from these locations are used to perform C buffer writes in the data path unit 120. This phase takes 3 clock cycles time plus the amount of clock cycles needed to start and stop the pipeline operation.

The apparatus according to the invention generates the address sequence provided to the storage area 110 so that addresses to pixel locations for which the corresponding bit in the active state register 140 is "0" are completely skipped (omitted from the address sequence). Thus, the method and apparatus according to the invention save a considerable amount of clock cycles. In steps 3 through 5 described above, the variable portion of clock cycles (apart from the fixed number of clock cycles needed to start and stop the pipeline) decreases proportionally to the number of pixels that are not to be drawn. In complex images, a very large portion of the pixels are behind other pixels (or should not be drawn for other reasons described above). Thus, the invention saves a large portion of clock cycles. However, it should be noted that the indicated numbers of clock cycles are mere examples. In a certain operation phase, more than one clock cycle may be needed for each pixel. It is also possible that the number of required clock cycles varies on pixel by pixel basis.

What is claimed is:

1. Method for performing graphics operations on a number of pixels, said pixels being organized as sets of data values indicating at least two types of parameters, wherein at least one of said types contains information concerning whether or not said pixel is to be suppressed; said method comprising:

receiving said pixels from an external source and storing each one of them into a predetermined address in a storage area;

establishing a set of status indicators each having an active state and a passive state, wherein the number of said status indicators at least equals the maximum number of pixels in said storage area;

in connection with reception of a number of said pixels, initializing the corresponding ones of said status indicators to said active state;

performing a number of predetermined mathematical operations on said pixel stored in said predetermined address, at least some of said mathematical operations comprising a decision of whether or not said pixel is to be suppressed;

conditionally rewriting said pixel into said storage area if further mathematical operations are to be carried out on said pixel, and otherwise outputting said pixel to an external destination;

in response to said decision indicating that any of said pixels is to be suppressed, changing the corresponding one of said status indicators to said passive state;

wherein said predetermined addresses are generated by skipping the corresponding address in response to the corresponding one of said status indicators being in said passive state; and at substantially equal intervals for several consecutive pixels, regardless of whether or not one or more addresses is/are skipped.

2. Method according to claim 1, wherein each of said substantially equal intervals equals the length of one clock cycle.

3. Data processing apparatus for performing graphics operations on a number of pixels, said pixels being organized as sets of data values indicating at least two types of parameters, wherein at least one of said types contains information (Z, T) concerning whether or not said pixel is to suppressed; said apparatus comprising:

input means for receiving said pixels from an external source (100) and storing each pixel into a predetermined address in a storage area (110);

a data path unit (120), being arranged to receive pixels from and write them to said storage area (110) and to perform predetermined mathematical operations on said pixels, stored at said predetermined addresses, wherein said mathematical operations comprise at least a decision of whether or not a pixel is to be suppressed;

control logic means (130) for providing said predetermined addresses to said storage area (110);

a status register (140) for indicating whether or not each one of said pixels in said storage area (110) is to be suppressed, said status register (140) being operationally coupled to said control logic means (130);

wherein said control logic means (130) is:

operationally coupled to said data path unit (120) for receiving status data therefrom, said status data indicating whether or not a pixel recently processed by said data path unit (120) is to be suppressed;

arranged to modify the contents of said status register (140) on the basis of said status information from said data path unit (120); and arranged to essentially prevent said data path unit (120) from writing a pixel to and/or reading it from said storage area (110) by skipping the corresponding address if said status register (140) indicates that the pixel in question is to be suppressed; and arranged to provide said predetermined addresses at substantially equal intervals for several consecutive pixels, regardless of whether or not one or more addresses is/are skipped.

4. Apparatus according to claim 3, wherein said status register (140) is organized as a one-dimensional array of indicators, preferably bits, the number of which is at least equal to the maximum number of pixels in said storage area (110).

5. Apparatus according to claim 4, wherein each of said substantially equal intervals equals the length of one clock cycle.

6. Apparatus according to claim 3, wherein said status register (140) is directly connected to said control logic means (130).

7. Apparatus according to claim 6, wherein each of said substantially equal intervals equals the length of one clock cycle.

8. Apparatus according to claim 3, wherein each of said substantially equal intervals equals the length of one clock cycle.

* * * * *